US010949277B2

(12) United States Patent
Borlick et al.

(10) Patent No.: US 10,949,277 B2
(45) Date of Patent: Mar. 16, 2021

(54) MONITORING CORRECTABLE ERRORS ON A BUS INTERFACE TO DETERMINE WHETHER TO REDIRECT INPUT/OUTPUT (I/O) TRAFFIC FROM A FIRST PROCESSING UNIT TO A SECOND PROCESSING UNIT

(71) Applicant: International Business Machines Corporation, Armonk, NY (US)

(72) Inventors: Matthew G. Borlick, Tucson, AZ (US); Lokesh M. Gupta, Tucson, AZ (US); Trung N. Nguyen, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/507,017

(22) Filed: Jul. 9, 2019

(65) Prior Publication Data
US 2019/0332456 A1    Oct. 31, 2019

Related U.S. Application Data

(63) Continuation of application No. 15/612,791, filed on Jun. 2, 2017, now Pat. No. 10,430,264.

(51) Int. Cl.
*G06F 11/00* (2006.01)
*G06F 11/07* (2006.01)

(52) U.S. Cl.
CPC ........ *G06F 11/0727* (2013.01); *G06F 11/076* (2013.01); *G06F 11/0745* (2013.01);
(Continued)

(58) Field of Classification Search
CPC .............. G06F 11/076; G06F 11/0727; G06F 11/0745; G06F 11/0793; G06F 11/1616; G06F 11/20–2012
See application file for complete search history.

(56) References Cited

U.S. PATENT DOCUMENTS 7,620,710 B2    11/2009   Kottomtharayil et al.
10,430,264 B2   10/2019   Borlick et al.
(Continued)

FOREIGN PATENT DOCUMENTS

WO      2017052661      3/2014

OTHER PUBLICATIONS

"PCI Express® Base Specification Revision 3.0", dated Nov. 10, 2010, PCI Express, Total 860 pages.
(Continued)

*Primary Examiner* — Michael Maskulinski
(74) *Attorney, Agent, or Firm* — David W. Victor; Konrad, Raynes, Davda and Victor LLP

(57) ABSTRACT

Provided are a computer program product for managing bus interface errors in a storage system coupled to a host and storage. A determination is made as to whether a first number of correctable errors on a first bus interface, connecting a first processing unit to the storage, exceeds a second number of correctable errors on a second bus interface, connecting a second processing unit to the storage, by a difference threshold. The correctable errors in the first and second bus interfaces are detected and corrected in the first and second bus interfaces by first hardware and second hardware, respectively. In response to determining that the first number of correctable errors exceeds the second number of correctable errors by the difference threshold, at least a portion of Input/Output (I/O) requests are redirected to a second processing unit using the second bus interface to connect to the storage.

21 Claims, 7 Drawing Sheets

(52) U.S. Cl.
CPC ...... *G06F 11/0754* (2013.01); *G06F 11/0793* (2013.01); *G06F 2201/81* (2013.01)

(56) References Cited

U.S. PATENT DOCUMENTS

| | | |
|---|---|---|
| 10,528,437 B2 | 1/2020 | Borlick et al. |
| 2004/0136319 A1 | 7/2004 | Becker et al. |
| 2006/0184846 A1 | 8/2006 | Hillier et al. |
| 2007/0162786 A1 | 7/2007 | Shuma |
| 2010/0083030 A1 | 4/2010 | Thayer |
| 2011/0246833 A1 | 10/2011 | Bockhaus et al. |
| 2012/0144230 A1 | 6/2012 | Buckland et al. |
| 2014/0173364 A1 | 6/2014 | Nishita |
| 2015/0089310 A1 | 3/2015 | Motwani et al. |
| 2015/0127969 A1 | 5/2015 | Arroyo et al. |
| 2016/0299808 A1 | 10/2016 | Yoshida |
| 2017/0091013 A1 | 3/2017 | Tallam et al. |
| 2017/0116090 A1 | 4/2017 | Arroyo et al. |
| 2018/0349217 A1 | 12/2018 | Borlick et al. |

OTHER PUBLICATIONS

"PCIe Error Logging and Handling on a Typical SoC", (online) retrieved from the Internet on May 15, 2017 at URL>https://www.design-reuse.com/articles/38374/pcie-error-logging-and-han . . . , Total 50 pages.

Westphal et al., "IBM System Storage DS8000 Architecture and Implementation", dated Nov. 2012, International Technical Support Organization, Total 534 pages.

List of IBM Patents or Patent Applications Treated As Related, pp. 2, dated Jul. 9, 2019.

US Patent Application, dated Jun. 2, 2017, for U.S. Appl. No. 15/612,715, filed Jun. 2, 2017 ,invented by Matthew G. Borlick et al., Total 34 pages.

Office Action, dated Dec. 31, 2018 for U.S. Appl. No. 15/612,715, filed Jun. 2, 2017 ,invented by Matthew G.Borlick et al., Total pages.

Response dated Apr. 1, 2019, pp. 9, to Office Action, dated Dec. 31, 2018, for U.S. Appl. No. 15/612,715.

Notice of Allowance, dated May 10, 2019, for U.S. Appl. No. 15/612,715, filed Jun. 2, 2017. Total 10 pages.

Office Action1, dated Oct. 7, 2020, for U.S. Appl. No. 16/445,186, filed Jun. 18, 2019, Total 22 pages.

MONITORING CORRECTABLE ERRORS ON A BUS INTERFACE TO DETERMINE WHETHER TO REDIRECT INPUT/OUTPUT (I/O) TRAFFIC FROM A FIRST PROCESSING UNIT TO A SECOND PROCESSING UNIT

BACKGROUND OF THE INVENTION

Field of the Invention

The present invention relates to a computer program product, system, and method for monitoring correctable errors on a bus interface to determine whether to redirect input/output (I/O) traffic from a first processing unit to a second processing unit.

Description of the Related Art

In a storage environment, a storage system may include redundant processors and components that communicate over multiple Peripheral Component Interconnect Express (PCIe) busses. The PCIe bus technology provides error logging and error handling within the PCIe hardware. The PCIe hardware classifies errors as uncorrectable errors or correctable errors. Correctable errors may have an impact on performance, such as latency and bandwidth, but no data/information is lost and the PCIe bus remains reliable. Examples of correctable errors include a bad transaction layer packet (TLP) error, such as a bad Link Cyclical Redundancy Check (LCRC) or incorrect sequence number, bad data link layer packet (DLLP), such as a replay timer timeout receiver error, framing error, etc. Uncorrectable non-fatal errors comprise errors that do not have an impact on the integrity of the PCIe bus interface, but data/information is lost. Non-fatal errors are corrupted transactions that cannot be corrected by the bus hardware. Uncorrectable fatal errors are errors which impact the integrity of the PCIe bus interface such that the link is no longer reliable and data is lost. Recovery from a fatal error requires resetting the component and link.

There is a need in the art for improved techniques for managing bus interface errors.

SUMMARY

Provided are a computer program product for managing bus interface errors in a storage system coupled to a host and storage. A determination is made as to whether a first number of correctable errors on a first bus interface, connecting a first processing unit to the storage, exceeds a second number of correctable errors on a second bus interface, connecting a second processing unit to the storage, by a difference threshold. The correctable errors in the first and second bus interfaces are detected and corrected in the first and second bus interfaces by first hardware of the first bus interface and second hardware of the second bus interface, respectively. In response to determining that the first number of correctable errors exceeds the second number of correctable errors by the difference threshold, at least a portion of Input/Output (I/O) requests are redirected to a second processing unit using the second bus interface to connect to the storage.

DETAILED DESCRIPTION

In a storage system having redundant bus interfaces, such as PCIe bus interfaces, to connect redundant processing units to redundant device adaptors and host adaptors, correctable errors may propagate on the bus interface as workload increases. Certain operations, such as a concurrent code load at a processing unit and other operations, may increase traffic and the correctable errors on the PCIe bus to the point that uncorrectable errors begin occurring, which results in data and information loss, as well as fatal uncorrectable errors, which may result in eventual loss of access to the components and cessation of processing of I/O requests in the storage system.

Described embodiments provide techniques to handle correctable errors in a storage system having redundant components by redirecting I/O requests to a different bus interface when a bus interface over which I/O requests are being transmitted experiences a level of correctable errors that increases the likelihood that uncorrectable errors may arise. Some or all of the I/O requests may be redirected by having a processing unit transmit I/O requests on a different bus interface to another device adaptor to connect to the storage. Redirecting I/O requests from the bus interface experiencing correctable errors allows that bus interface to be repaired and brought back into use after the problem resulting in the high level of correctable errors is fixed.

In further embodiments, the processing units and host adaptors in the system may determine whether one bus interface has a high level of correctable errors relative to another bus interface and redirect at least a portion of the I/O requests to the other bus interface. Relieving I/O traffic on the bus interface experiencing a relatively high level of correctable errors reduces the amount of correctable errors and reduces the likelihood that the bus interface will experience uncorrectable errors.

Figure 1:
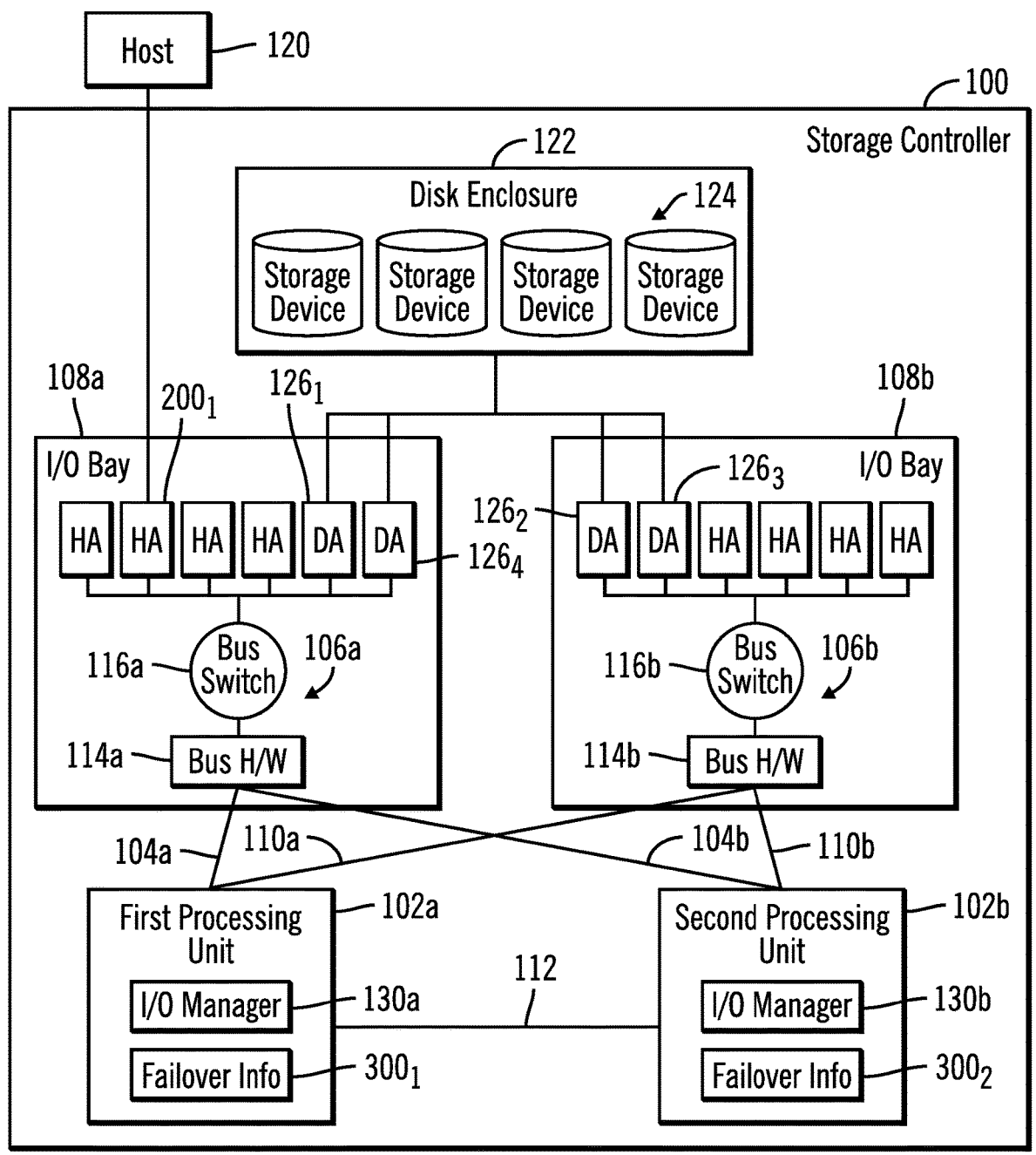
FIG. 1 illustrates an embodiment of a storage system.

FIG. 1 illustrates an embodiment of a storage controller 100 including a plurality of independent processing units 102*a*, 102*b*, such as a processor complex (CEC), that each have a connection 104*a*, 104*b* to a first bus interface 106*a*, that connects to a first Input/Output (I/O) bay 108*a* and the device adaptors (DA) and hardware adaptors (HA) therein. Each of the processing units 102*a*, 102*b* have a connection 110*a*, 110*b* to a second bus interface 106*b*, that connects to a second Input/Output (I/O) bay 108*b*. The processing units 102a, 102b may also communicate with each other directory over a link 112, such as a Remote I/O (RIO) loop.

Each bus interface 106a, 106b includes bus hardware 114a, 114b to manage bus operations and log errors, a bus switch 116a, 116b to connect to adaptor endpoints, including host adaptors (HA) and device adaptors (DA) in the I/O bays 108a, 108b. A host 120 connects to the storage controller 100 through a host adaptor $200_1$ in the I/O bay 108a.

In one embodiment, the bus interfaces 106a, 106b may comprise Peripheral Component Interconnect Express (PCIe) bus interface technology, and the bus hardware 114a, 114b may comprise the root complex of the PCIe bus. In alternative embodiments, the bus interfaces 106a, 106b may utilize suitable bus interface technology other than PCIe.

A disk enclosure 122 includes a plurality of storage devices 124 in which logical volumes are configured. Each processing unit 102a, 102b is assigned one of the device adaptors in each of the I/O bays 108a, 108b that connect to the disk enclosure 122 to provide access to data configured in the storage devices 124. Each processing unit 102a, 102b has a default configuration to default communicate with a device adaptor (DA) in one of the I/O bays 108a, 108b, where the default configuration will assign the different processing units 102a, 102b to device adaptors in different of the I/O bays 108a, 108b. For instance, in the default configuration, first processing unit 102a may be default assigned device adaptor $126_1$ in I/O bay 108a and also assigned a redundant device adaptor $126_2$ in the other I/O bay 108a for a failover. The second processing unit 102b may be default assigned device adaptor $126_3$ in I/O bay 108b and also assigned a redundant device adaptor $126_4$ in the other I/O bay 108a for use in a failover.

Each processing unit 102a, 102b includes an I/O manager 130a, 130b to manage I/O requests from attached hosts to storage space configured in the storage devices 124 of the disk enclosure 122, and perform other related operations, such as path selection and error handling. Each processing unit 102a, 102b further maintains failover information 300a, 300b providing information on errors collected in the bus interfaces 106a, 106b used to determine whether to failover from a currently used device adaptor (DA) in one of the I/O bays 108a, 108b to the other of the device adaptors (DA) in the other of the I/O bays 108b, 108a.

In the embodiment of FIG. 1, two redundant processing units 102a, 102b, two bus interfaces 106a, 106b and two I/O bays 108a, 108b are shown. In further embodiments, there may be more than the number of shown redundant elements 102a, 102b, 106a, 106b, 108a, 108b, to provide additional redundancy.

The storage controller 100 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world).

The storage devices 124 in the disk enclosure 122 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 124 in the disk enclosure 122 may comprise heterogeneous storage devices from different vendors and different types of storage devices, such as a first type of storage devices, e.g., hard disk drives, that have a slower data transfer rate than a second type of storage devices, e.g., SSDs.

The components, such as the I/O managers 130a, 130b, host adaptors (HA), and device adaptors (DA) may be implemented in computer readable program instructions in a computer readable storage medium executed by a processor and/or computer hardware, such as an Application Specific Integrated Circuit (ASIC).

Figure 2:
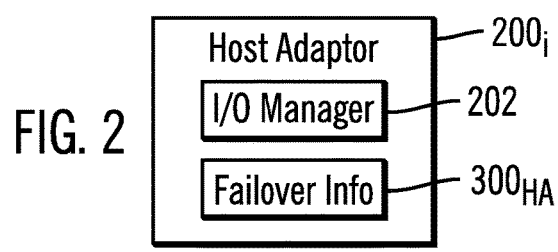
FIG. 2 illustrates an embodiment of a host adaptor in the storage system.

FIG. 2 illustrates an embodiment of one of the host adaptors (HA) $200_i$ in the I/O bays 108a, 108b, and includes an I/O manager 202 to manage I/O requests received from connected hosts to route to one of the processing units 102a, 102b, and to return requested data to the connected host 120. The host adaptor $200_i$ may further maintain an instance of the failover information $300_{HA}$ to use to determine whether to redirect traffic from one processing unit 102a to the other 102b.

Figure 3:
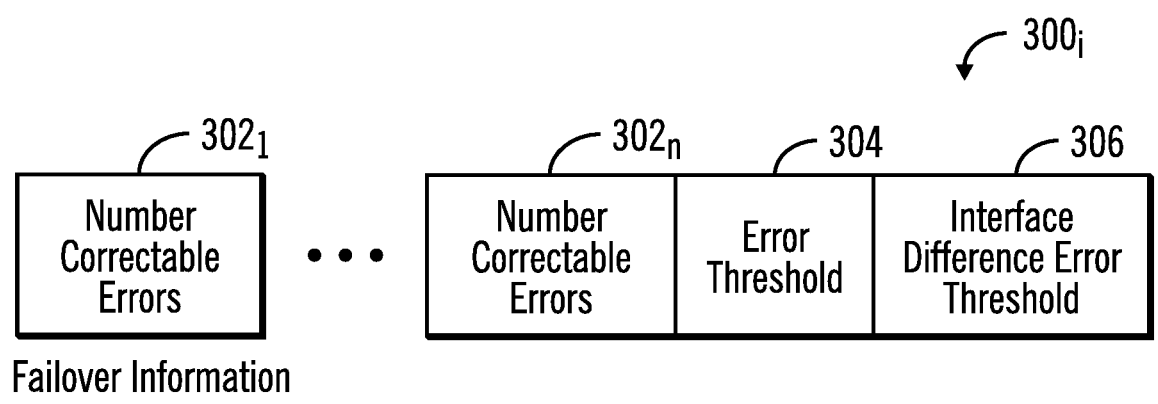
FIG. 3 illustrates an embodiment of failover information used to determine whether to failover to another device adaptor in the storage system.

FIG. 3 illustrates an embodiment of the failover information $300_i$, such as the instances of failover information $300_1$, $300_2$, $300_{HA}$, and includes for each bus interface, e.g. 106a, 106b, a number of correctable errors $302_1$, . . . $302_n$ for n respective bus interfaces, e.g., 106a, 106b, measured within a time period. A correctible error may comprise an error detected and logged in the bus hardware 114a, 114b of the bus interfaces 106a, 106b that may be corrected in the bus hardware 114a, 114b.

The failover information $300_i$ further includes an error threshold 304 and an interface difference error threshold 306. The error threshold 304 is used to determine whether the number of correctable errors $302_i$ for a bus interface reaches a sufficient number such that uncorrectable errors are likely to soon result. The bus interface 106a, 106b may operate with a certain number of correctable errors. However, if the correctable errors increase beyond the error threshold 304, then the burden on the bus hardware 114a, 114b to error correct correctable errors may result in uncorrectable errors. The interface difference error threshold 306 is used to determine whether a difference in the number of correctable errors e.g., $302_1$ and $302_2$, between two bus interfaces, e.g., 106a, 106b, is of a sufficient amount to trigger load balancing to redirect I/O requests from the bus interface 106a, 106b having the greater number of correctable errors to the other bus interface, e.g., 106b, 106a, having fewer correctable errors.

Figure 4:
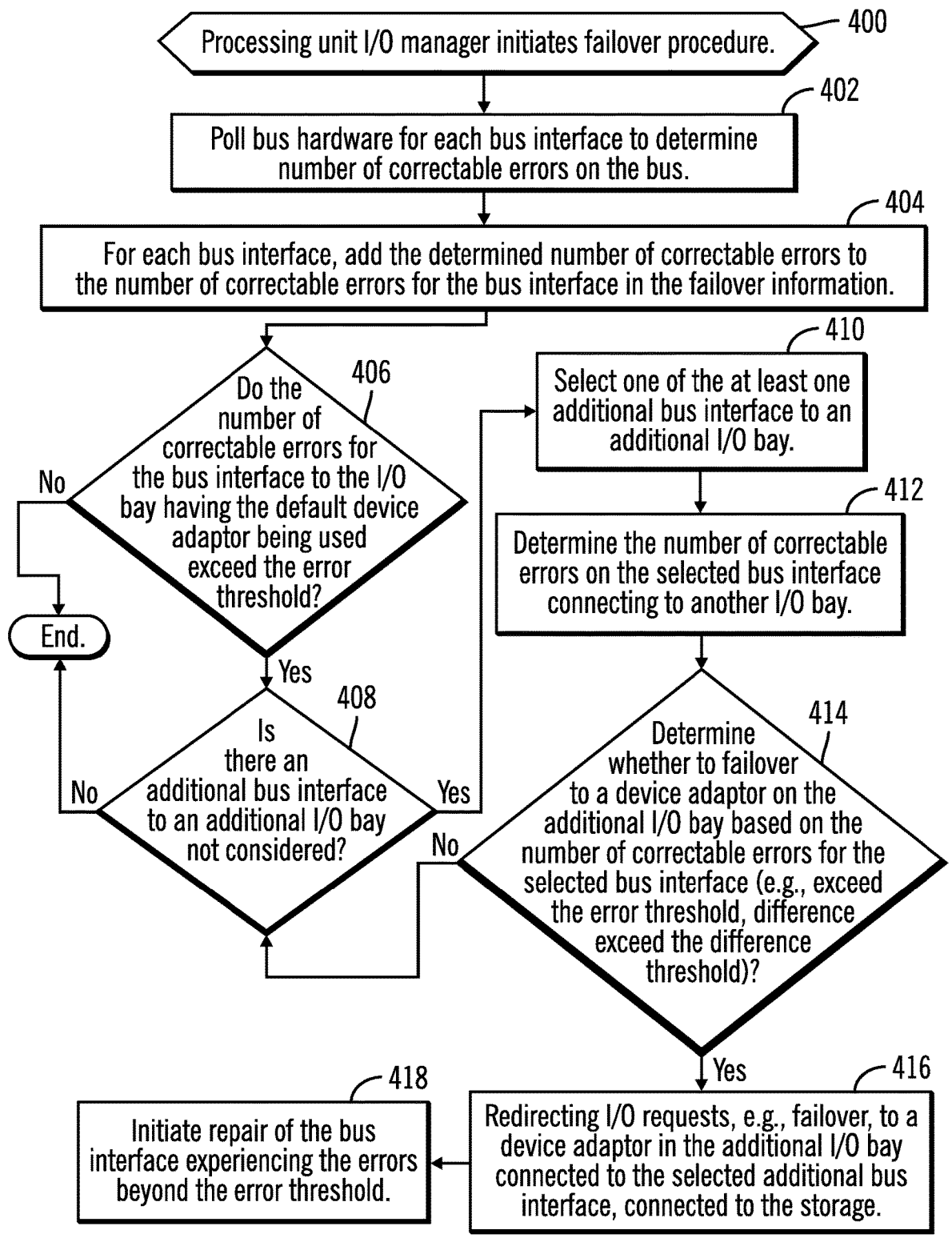
FIG. 4 illustrates an embodiment of operations to perform a failover to another device adaptor in the storage system.

FIG. 4 illustrates an embodiment of operations performed by the I/O manager 130a, 130b in one of the processing units 102a, 102b to initiate a failover procedure. Upon initiating (at block 400) operations to determine whether to initiate a failover, the I/O manager 130a, 130b polls (at block 502) the bus hardware 114a, 114b to determine a number of correctable errors on the bus 106a, 106b. The determined number of correctable errors is added (at block 404) to the number of correctable errors $302_1$ . . . $302_n$ for each polled bus interface 106a, 106b. The number of correctable errors $302_1$ . . . $302_n$ number may be periodically cleared, such that the number of correctable errors $302_1$ . . . $302_n$ is incremented after multiple polling operations until cleared, or the number of correctable errors $302_1$ . . . $302_n$ may be set to the determined number upon each determination.

If (at block 406) the number of correctable errors $302_i$, for the bus interface 106a, 106b to the I/O bay 108a, 108b having the default device adaptor (DA), e.g., 126₁, 126₃, being used, exceeds the error threshold 304, then a determination is made (at block 408) whether there is an additional bus interface 106a, 106b to an additional I/O bay 108a, 108b not yet considered for failover. If so, then the I/O manager 130a, 130b selects (at block 410) one of the at least one additional bus interface 106a, 106b to an I/O bay 108a, 108b, not yet considered. The number of correctible errors 302ᵢ for the selected bus interface 106a, 106b are determined (at block 412) and a determination is made (at block 414) whether to failover to a device adaptor (DA), e.g., 126₂, 126₄, on the additional I/O bay 108a, 108b based on the number of correctable errors 302ᵢ for the selected bus interface 106a, 106b. If (at block 414) a determination is made to failover, then the I/O manager 130a, 130b redirects (at block 416) at least a portion of I/O requests, e.g., failover, to a device adaptor (DA) 126₂, 126₄, in the additional I/O bay 108a, 108b connected to the selected additional bus interface 106a, 106b, to connect to storage space configured in the storage devices 124 in the disk enclosure 122. In performing the redirecting of I/O requests, some or all of the I/O requests may be redirected. In an embodiment where the path through the bus interface 106a, 106b experiencing the correctable errors will be repaired, all the I/O requests may be redirected to the other device adaptor. Upon failing over to the new device adaptor, repairs may be initiated on the bus interface 106a, 106b on which the correctible errors were experienced resulting in the failover, such as resetting the bus interface 106a, 106b or performing other reconfiguration operations. If (at block 406) the number of correctable errors 302ᵢ for the active bus interface 106a, 106b does not exceed the error threshold 304 or if (at block 408) there are no further additional bus interfaces to consider for failover, then control ends without failing over to a device adaptor in another I/O bay 108a, 108b over a different bus interface 106a, 106b than currently being used.

In one embodiment, the determination at block 414 may determine whether the number correctable errors 302ᵢ for the selected bus interface 106a, 106b, being considered for failover, exceeds the error threshold 304, so that failover will not occur to the selected bus interface 106a, 106b if the selected bus interface 106a, 106b is also experiencing a high level of correctible errors also likely to result in uncorrectable errors occurring. In a further embodiment, the determination at block 414 may consider whether a difference in the number of correctable errors between the current active bus interface 106a, 106b and the selected bus interface exceeds the error difference threshold 306 to warrant failing over to another device adaptor (DA), e.g., 126₂, 126₄, in the I/O bay 108a, 108b connected to the selected bus interface 106a, 106b. For instance, if the difference in correctable errors does not exceed the threshold 306, then failing over may not be desirable because the difference in the number of correctable errors between the bus interface 106a, 106b experiencing the high level of correctable errors is not sufficient to allow the other bus interface 106a, 106b to absorb the redirected traffic without also experiencing uncorrectable errors.

With the embodiments of FIG. 4, a processing unit 102a, 102b may determine to failover to a device adaptor in a different I/O bay 108a, 108b upon determining that correctable errors exceed a threshold, even though such correctable errors are not affecting the reliability of the bus interface 106a, 106b and data integrity of data transmitted over the bus interface 106a, 106b. However, once the error threshold is exceeded, there is a desire to redirect I/O requests from the bus interface 106a, 106b experiencing the relatively high number of correctable errors as a preventive measure to avoid correctable errors increasing to a level to cause burdens resulting in uncorrectable errors.

Figure 5:
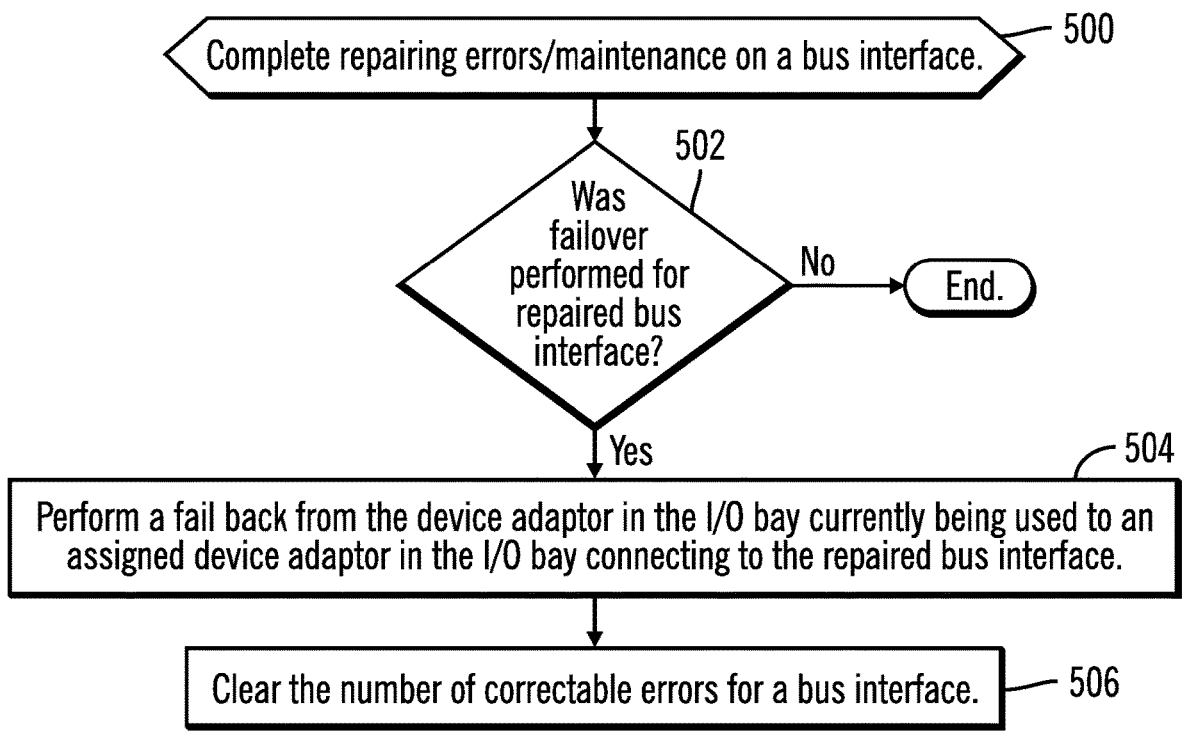
FIG. 5 illustrates an embodiment of operations to perform a failback upon correction or repair of errors in a bus interface.

FIG. 5 illustrates an embodiment of operations performed by an I/O manager 130a, 130b at the processing units 102a, 102b to failback after completing repairing errors and/or performing maintenance on the bus interface 106a, 106b experiencing more than the error threshold 304 number. Upon (at block 500) completing repairing a bus interface 106a, 106b, such as one repaired at block 418 in FIG. 4, a determination is made as to whether a failover occurred with respect to the repaired bus interface 106a, 106b. If so, then a failback is performed (at block 504) from the device adaptor in the I/O bay 108a, 108b currently being used to the default device adaptor (DA) in the I/O bay 108a, 108b connected to the repaired bus interface 106a, 106b or components. The number of correctible errors 302ᵢ for the repaired bus interface 106a, 106b may then be cleared to re-accumulate.

With the operations of FIG. 5, after repairing a bus interface 106a, 106b that was the subject of a failover, a failback may be performed for the processing unit 102a, 102b to return to using the default device adaptor in the I/O bay 108a, 108b to which the repaired bus interface 106a, 106b connects. This provides a balancing of the workload by returning to the default device adaptor because after the failover, both processing units 102a, 102b would be directing I/O requests toward the surviving I/O bay 108a, 108b using the same bus interface 106a, 106b. Returning the processing unit 102a, 102b to using its default device adaptor on the repaired bus interface 106a, 106b and I/O bay 108a, 108b rebalances the workload across both bus interfaces 106a, 106b, which further reduces the likelihood that correctible errors will transform into uncorrectable errors.

Figure 6:
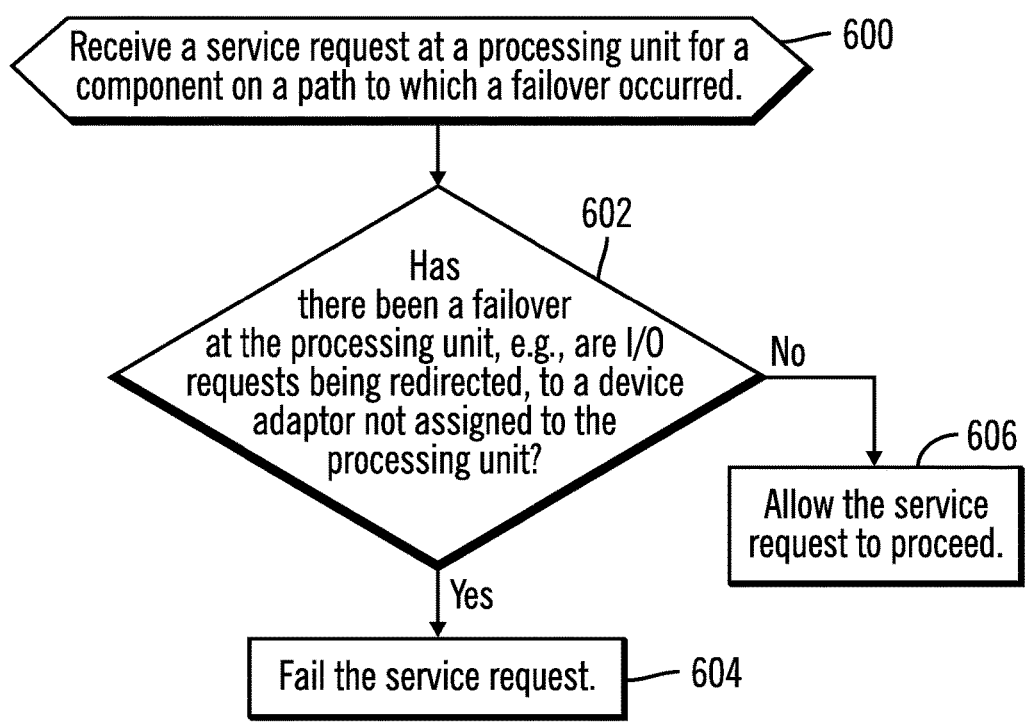
FIG. 6 illustrates an embodiment of operations to process a service request at a processing unit in the storage system.

FIG. 6 illustrates an embodiment of operations performed by the I/O manager 130a, 130b at a processing unit 102a, 102b receiving a service request to perform a service operation, such as a code load update, repairing of a component in the processing unit 102a, 102b, or a repair/update operation for the I/O bay 108a, 108b or device adaptor (DA) the processing unit 102a, 102b is currently using after the failover. Upon receiving (at block 602) the service request, the I/O manager 130a, 130b determines (at block 602) whether there has been a failover at the processing unit 102a, 102b, such that I/O requests are being redirected on another bus interface 106a, 106b to a non-default assigned device adaptor. If (at block 602) there was a failover, then the service request is failed (at block 604), otherwise, if there was no failover, then the service request is allowed to proceed (at block 606).

With the described embodiments of FIG. 6, the service request is failed if there has been a failover to avoid additional load on the processing unit 102a, 102b and the failover bus interface 106a, 106b being used, because during failover, some or all of the I/O requests for both processing units 102a, 102b are being redirected to the surviving bus interface 106a, 106b and I/O bay 108a, 108b, or limited number of such components. Adding further load during the failover could increase the number of correctable errors experienced on the sole surviving bus interface 106a, 106b being used, which could result in uncorrectable errors, which would impair the integrity of the sole or limited number of surviving bus interface 106a, 106b.

Figure 7:
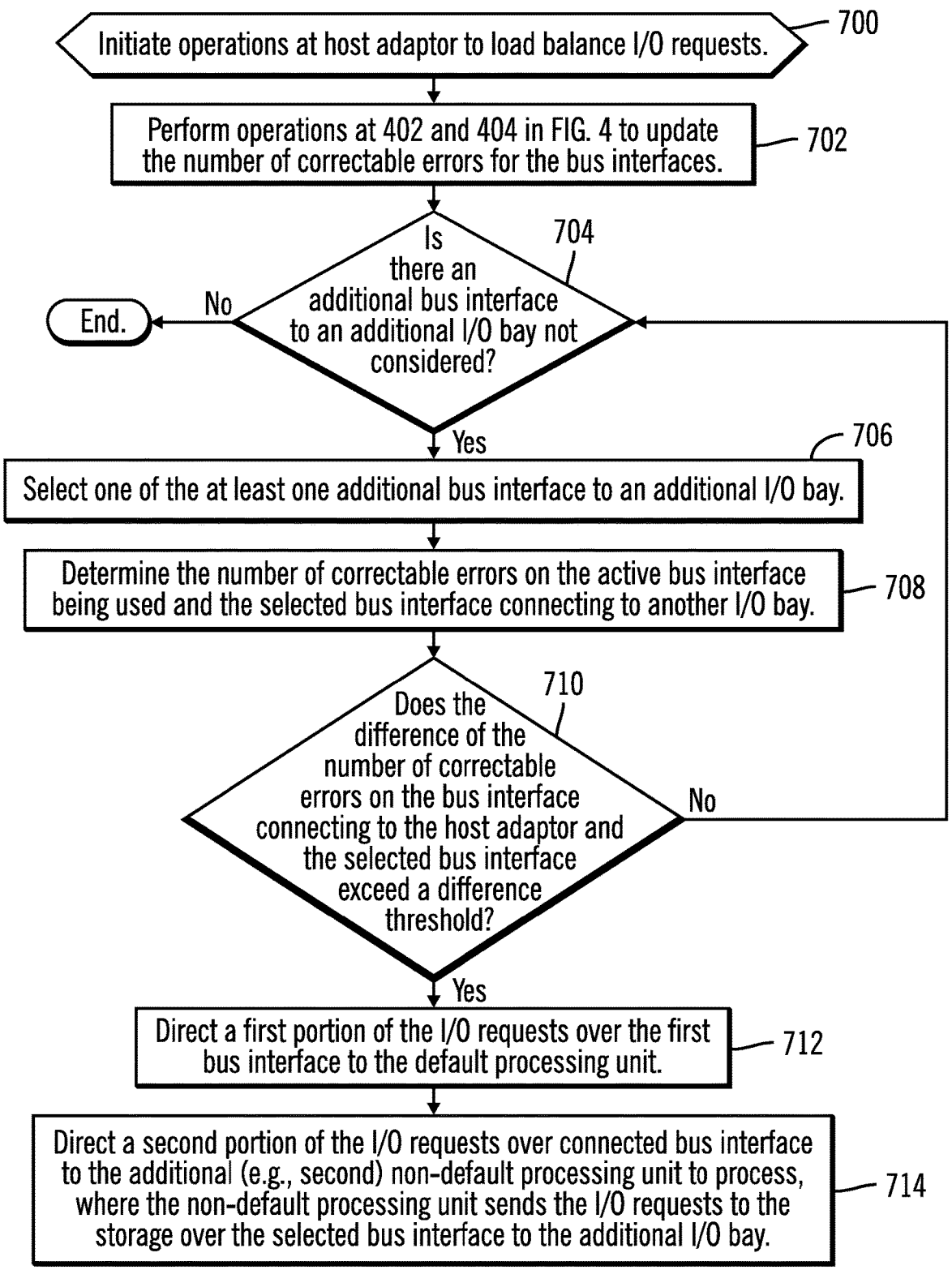
FIG. 7 illustrates an embodiment of operations for a host adaptor to rebalance Input/Output (I/O) request workload in the storage system.

FIG. 7 illustrates an embodiment of operations performed by the I/O manager 202 at the host adaptor 200ᵢ, e.g., host adaptor 200₁, to determine whether to perform a load balancing operation to redirect a portion of host I/O requests to the other processing unit 102a, 102b. In one embodiment, the initial configuration would be for host adaptors (HAs) in an I/O bay to direct I/O requests to the processing unit 102a, 102b having a default assigned device adaptor (e.g., $126_1$, $126_3$) in the I/O bay 108a, 108b of the host adaptor (HA). Upon initiating (at block 700) load balancing operations, the host adaptor I/O manager 202 performs operations 402 and 404 in FIG. 4 to update correctable errors for the bus interface 106a or 106b connecting to the I/O bay 108a or 108b including the host adaptor $200_i$ and for other bus interfaces 106a or 106b connecting to I/O bays 108a or 108b not including the host adaptor $200_i$ performing the operations of FIG. 7. The I/O manager 202 may determine the number of correctible errors $302_i$ for bus interfaces 106a, 106b, such as those not connected to the I/O bay 108a, 108b including the host adaptor $200_i$, by sending messages to the processing units 102a, 102b for their failover information $300_1$, $300_2$. If (at block 704) there is an additional bus interface 106a, 106b to an additional non-default processing unit 102a, 102b not already considered, then the I/O manager 202 determines the number of correctible errors on the active bus interface 106a or 106b connecting to the I/O bay 108a, 108b including the host adaptor $200_i$ and the number of correctible errors on the selected bus interface connecting to another I/O bay 108b, 108a.

If (at block 710) the difference of the number of correctible errors on the bus interface connecting to the host adaptor $200_i$ and the selected other bus interface exceed the difference threshold 306, then the host adaptor I/O manager 202 directs (at block 712) a first portion of I/O requests over the bus interface 106a or 106b, connecting to the host adaptor $200_i$, to the default processing unit 102a or 102b and directs (at block 714) a second portion of the I/O requests over the bus interface 106a or 106b connecting to the host adaptor $200_i$ to a non-default assigned processing unit 102a or 102b. The non-default processing unit 102a or 102b in turn would send the I/O requests over the selected bus interface 106a, 106b to an I/O bay 108a, 108b not including the host adaptor $200_i$ initiating the redirecting of the second portion of the I/O requests. If (at block 710) the difference of the number of correctible errors does not exceed the difference threshold 306, then control proceeds back to block 704 to determine if there is an additional bus interface to consider, in implementations having more than two redundant bus interfaces 106a, 106b. If (at block 704) there are no additional bus interfaces to consider, then control ends without rebalancing the workload among the processing units 102a, 102b.

With the embodiment of FIG. 7, a host adaptor may rebalance I/O request workload by directing a portion of the I/O requests to a non-default processor 102a, 102b that sends I/O requests to the storage 124 over a bus interface 106a, 106b and I/O bay 108a, 108b not connected to the host adaptor $200_i$. This rebalancing reduces traffic on the bus interface 106a, 106b having a significantly greater number of correctable errors by redirecting I/O traffic to a non-default processing unit 102a, 102b using a bus interface 106a, 106b having a threshold number of fewer errors. Reducing traffic on a bus interface 106a, 106b having a higher relative number of correctable errors than other bus interfaces reduces the likelihood that the correctable errors on the bus interface 106a, 106b will reach a level that results in uncorrectable errors.

Figure 8:
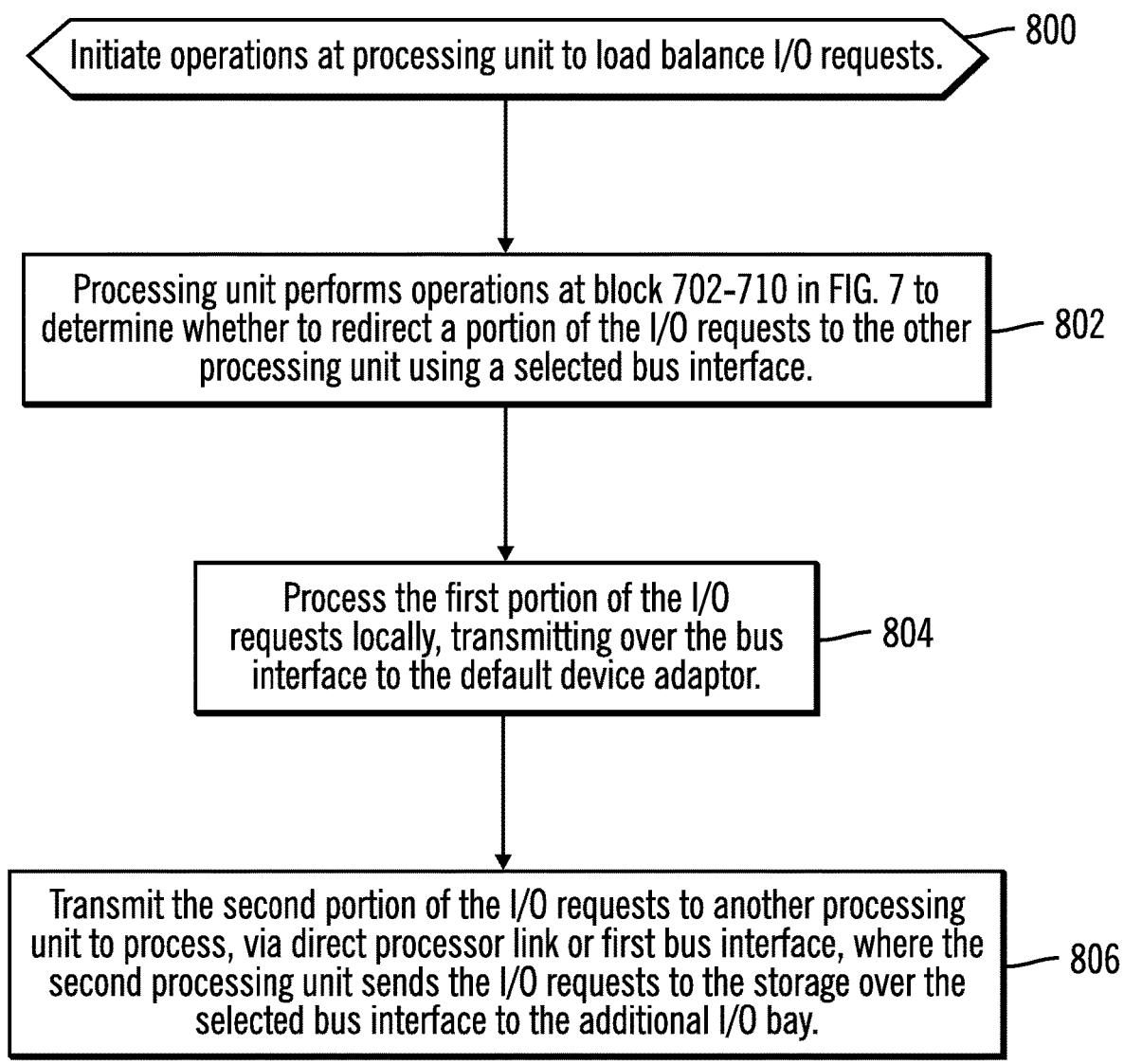
FIG. 8 illustrates an embodiment of operations for a processing unit to rebalance Input/Output (I/O) request workload to another processing unit in the storage system.

FIG. 8 illustrates an embodiment of operations performed by the I/O managers 130a, 130b in the processing units 102a, 102b to perform a load balancing operation to redirect a portion of host I/O requests to the other processing unit 102a, 102b. Upon (at block 800) one of the I/O managers 130a, 130b initiating operations to shift some of the load of I/O requests to the other processing unit, the I/O manager performs (at block 802) the operations at blocks 702 through 710 in FIG. 7 to determine whether to redirect a portion of the I/O requests to another processing unit using a selected additional bus interface, different from the bus interface 106a, 106b used by the processing unit 102a, 102b to connect to the default assigned device adaptor. The I/O manager 130a, 130b processes a first portion of the I/O requests locally, transferring over the bus interface 106a, 106b to the default device adaptor $126_1$, $126_3$. The I/O manager 130a, 130b transmits (at block 806) the second portion of the I/O requests to another processing unit 102a, 102b to process, via the direct processor link 112 or connecting bus interface 106a, 106b, such as first processing unit 102a sending the second portion of I/O requests over link 104a or through bus interface 106a via link 104b to the second processing unit 102b.

With the embodiment of FIG. 8, one of the processing units 102a, 102b may rebalance I/O request workload by directing a portion of the I/O requests to another processor 102a, 102b that sends I/O requests to the storage 124 over a different bus interface 106b, 106a from the bus interface 106a, 106b used by the processing unit 102a, 102b performing the load balancing. This rebalancing reduces traffic on the bus interface 106a, 106b having a significantly greater number of correctable errors by redirecting I/O traffic to the other processing unit 102a, 102b using a different bus interface 106a, 106b having fewer errors. Reducing traffic on a bus interface 106a, 106b having a higher relative number of correctable errors than other bus interfaces reduces the likelihood that the correctable errors on the bus interface 106a, 106b will reach a level that results in uncorrectable errors.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
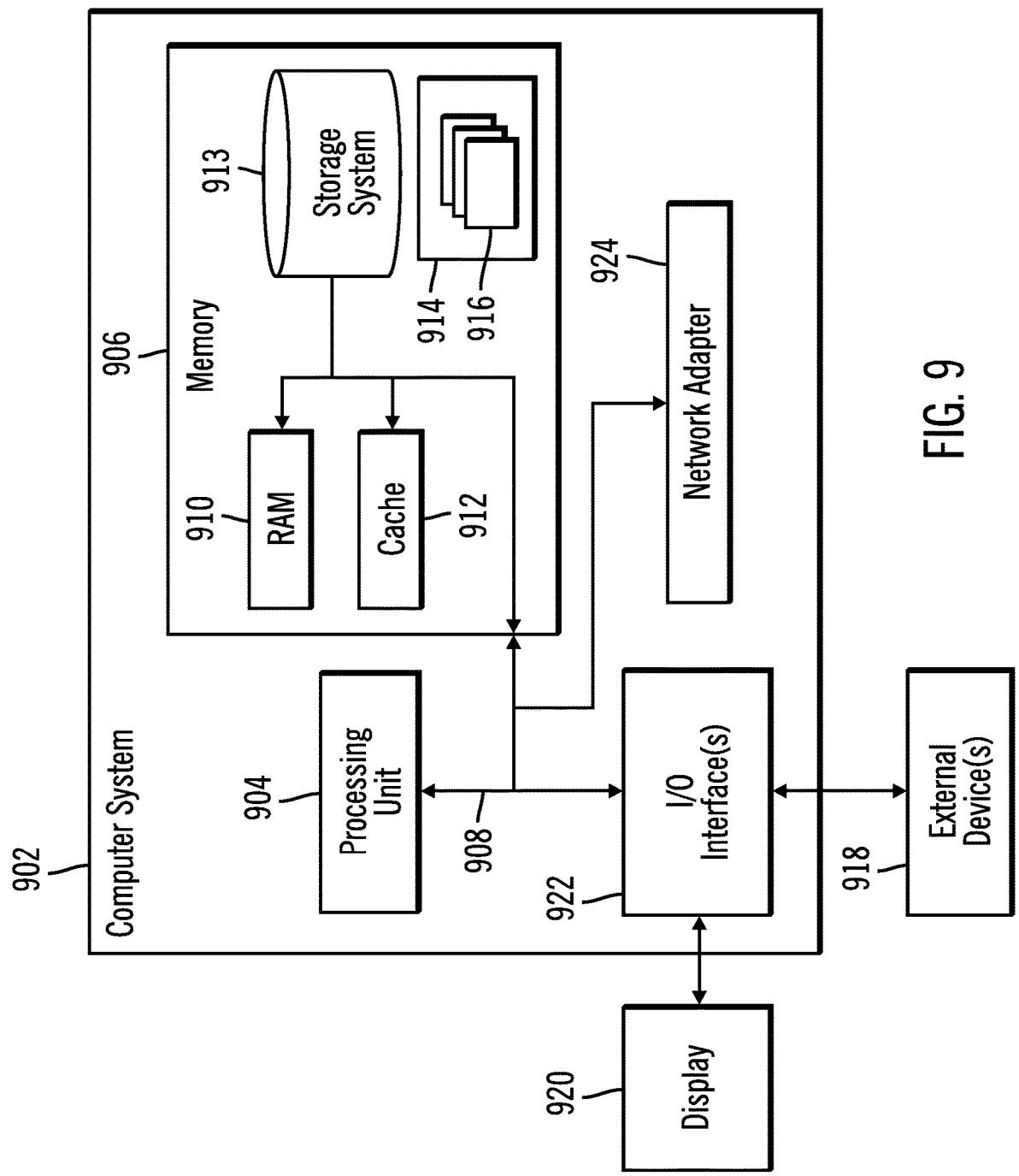
FIG. 9 illustrates an embodiment of a computer architecture used with described embodiments.

The computational components of FIG. 1, including the processing units 102a, 102b and host 120 may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product implemented in a host adaptor to manage I/O requests from a host to a storage, the computer program product comprising a computer readable storage medium having computer readable program code embodied therein that is executable to perform operations, the operations comprising:
   determining a first number of errors on a first bus interface that connects the host adaptor and a first device adaptor to a first processing unit and a second processing unit, wherein the first device adaptor comprises a default device adaptor the first processing unit uses to send Input/Output (I/O) requests to the storage;
   determining a second number of errors on a second bus interface that connects a second device adaptor to the first processing unit and the second processing unit, wherein the second device adaptor comprises a default device adaptor the second processing unit uses to send I/O requests to the storage;
   determining whether to redirect a portion of the I/O requests, received from the host at the host adaptor, from the first processing unit to the second processing unit based on the first number of errors and the second number of errors; and
   redirecting the portion of the I/O requests to the second processing unit in response to determining to redirect the portion of the I/O requests, wherein the second processing unit sends the portion of the I/O requests redirected to the second device adaptor to send to the storage.

2. The computer program product of claim 1, wherein the operations further comprise:
   determining whether the first number of errors exceed an error threshold indicating to perform a failover, wherein the determining whether to redirect the portion of the I/O requests and redirecting the portion of the I/O requests are performed in response to detecting that the first number of errors exceeds the error threshold.

3. The computer program product of claim 1, wherein the determining whether to redirect the portion of the I/O requests based on the first number of errors and the second number of errors comprises determining whether a difference of the first number of errors and the second number of errors exceed a difference threshold.

4. The computer program product of claim 3, wherein the operations further comprise:
   determining whether the second bus interface has not yet been considered for redirecting in response to determining that the first number of errors exceeds the difference threshold, wherein the determining whether to redirect the portion of the I/O requests is made in response to determining that the difference exceeds the difference threshold.

5. The computer program product of claim 1, wherein the first number and the second number of errors comprise correctable errors not affecting reliability of the first and the second bus interfaces and data integrity of data transmitted over the first and the second bus interfaces.

6. The computer program product of claim 1, wherein the operations further comprise:
   initiating load balance operations to redirect the portion of the I/O requests from the first processing unit to the second processing unit, wherein the determining the first number of errors, the second number of errors, whether to redirect the portion of the I/O requests, and the redirecting the portion of the I/O requests are performed in response to initiating the load balancing operations.

7. The computer program product of claim 1, wherein the first bus interface, the host adaptor and the first device adaptor are included in a first I/O bay and wherein the second bus interface and the second device adaptor are included in a second I/O bay.

8. A system for managing bus interface errors in a storage system coupled to a host and a storage, comprising:
   a first processing unit;
   a second processing unit;
   a first device adaptor comprising a default device adaptor for the first processing unit to connect to the storage;
   a second device adaptor comprising a default device adaptor for the second processing unit to connect to the storage;
   a host adaptor;
   a first bus interface connecting the first device adaptor and the host adaptor to the first and the second processing units;
   a second bus interface connecting the second device adaptor to the first and the second processing units;
   wherein the host adaptor performs operations, the operations comprising:
      determining a first number of errors on the first bus interface;
      determining a second number of errors on the second bus interface;
      determining whether to redirect a portion of Input/Output (I/O) requests, received from the host at the host adaptor, from the first processing unit to the second processing unit based on the first number of errors and the second number of errors; and
      redirecting the portion of the I/O requests to the second processing unit in response to determining to redirect the portion of the I/O requests, wherein the second processing unit sends the portion of the I/O requests redirected to the second device adaptor to send to the storage.

9. The system of claim 8, wherein the operations further comprise:
   determining whether the first number of errors exceed an error threshold indicating to perform a failover, wherein the determining whether to redirect the portion of the I/O requests and redirecting the portion of the I/O requests are performed in response to detecting that the first number of errors exceeds the error threshold.

10. The system of claim 8, wherein the determining whether to redirect the portion of the I/O requests based on the first number of errors and the second number of errors comprises determining whether a difference of the first number of errors and the second number of errors exceed a difference threshold.

11. The system of claim 10, wherein the operations further comprise:
   determining whether the second bus interface has not yet been considered for redirecting in response to determining that the first number of errors exceeds the difference threshold, wherein the determining whether to redirect the portion of the I/O requests is made in response to determining that that difference exceeds the difference threshold.

12. The system of claim 8, wherein the first number and the second number of errors comprise correctable errors not affecting reliability of the first and the second bus interfaces and data integrity of data transmitted over the first and the second bus interfaces.

13. The system of claim 8, wherein the operations further comprise:
   initiating load balance operations to redirect the portion of the I/O requests from the first processing unit to the second processing unit, wherein the determining the first number of errors, the second number of errors, whether to redirect the portion of the I/O requests, and the redirecting the portion of the I/O requests are performed in response to initiating the load balancing operations.

14. The system of claim 8, wherein the first bus interface, the host adaptor and the first device adaptor are included in a first I/O bay and wherein the second bus interface and the second device adaptor are included in a second I/O bay.

15. A method implemented in a host adaptor to manage I/O requests from a host to a storage, comprising:
   determining a first number of errors on a first bus interface that connects the host adaptor and a first device adaptor to a first processing unit and a second processing unit, wherein the first device adaptor comprises a default device adaptor the first processing unit uses to send Input/Output (I/O) requests to the storage;
   determining a second number of errors on a second bus interface that connects a second device adaptor to the first processing unit and the second processing unit, wherein the second device adaptor comprises a default device adaptor the second processing unit uses to send I/O requests to the storage;

determining whether to redirect a portion of the I/O requests, received from the host at the host adaptor, from the first processing unit to the second processing unit based on the first number of errors and the second number of errors; and redirecting the portion of the I/O requests to the second processing unit in response to determining to redirect the portion of the I/O requests, wherein the second processing unit sends the portion of the I/O requests redirected to the second device adaptor to send to the storage.

16. The method of claim 15, further comprising:

determining whether the first number of errors exceed an error threshold indicating to perform a failover, wherein the determining whether to redirect the portion of the I/O requests and redirecting the portion of the I/O requests are performed in response to detecting that the first number of errors exceeds the error threshold.

17. The method of claim 16, wherein the determining whether to redirect the portion of the I/O requests based on the first number of errors and the second number of errors comprises determining whether a difference of the first number of errors and the second number of errors exceed a difference threshold.

18. The method of claim 17, further comprising:

determining whether the second bus interface has not yet been considered for redirecting in response to determining that the first number of errors exceeds the difference threshold, wherein the determining whether to redirect the portion of the I/O requests is made in response to determining that that difference exceeds the difference threshold.

19. The method of claim 15, wherein the first number and the second number of errors comprise correctable errors not affecting reliability of the first and the second bus interfaces and data integrity of data transmitted over the first and the second bus interfaces.

20. The method of claim 15, further comprising:

initiating load balance operations to redirect the portion of the I/O requests from the first processing unit to the second processing unit, wherein the determining the first number of errors, the second number of errors, whether to redirect the portion of the I/O requests, and the redirecting the portion of the I/O requests are performed in response to initiating the load balancing operations.

21. The method of claim 15, wherein the first bus interface, the host adaptor and the first device adaptor are included in a first I/O bay and wherein the second bus interface and the second device adaptor are included in a second I/O bay.

* * * * *